United States Patent
Tuukkanen

(10) Patent No.: US 9,428,054 B2
(45) Date of Patent: Aug. 30, 2016

(54) METHOD AND APPARATUS FOR IDENTIFYING A DRIVER BASED ON SENSOR INFORMATION

(71) Applicant: HERE GLOBAL B.V., Veldenhoven (NL)

(72) Inventor: Marko Tapio Tuukkanen, Schlenzer (DE)

(73) Assignee: HERE Global B.V., Veldhoven (NL)

( * ) Notice: Subject to any disclaimer, the term of this patent is extended or adjusted under 35 U.S.C. 154(b) by 117 days.

(21) Appl. No.: 14/245,842

(22) Filed: Apr. 4, 2014

(65) Prior Publication Data
US 2015/0283902 A1    Oct. 8, 2015

(51) Int. Cl.
| | |
|---|---|
| B60Q 1/00 | (2006.01) |
| B60K 35/00 | (2006.01) |
| G06T 19/00 | (2011.01) |
| G06K 9/00 | (2006.01) |

(52) U.S. Cl.
CPC ........... *B60K 35/00* (2013.01); *G06K 9/00671* (2013.01); *G06K 9/00838* (2013.01); *G06K 9/00845* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 8,188,846 B2 | 5/2012 | Cooper et al. | |
| 8,605,009 B2 | 12/2013 | King et al. | |
| 8,686,922 B2 | 4/2014 | Breed | |
| 2004/0129478 A1* | 7/2004 | Breed | B60N 2/002 180/273 |
| 2008/0278821 A1 | 11/2008 | Rieger | |
| 2010/0014711 A1* | 1/2010 | Camhi | B60K 28/06 382/104 |
| 2010/0171767 A1* | 7/2010 | Waeller | B60K 35/00 345/672 |
| 2010/0222957 A1* | 9/2010 | Ohta | B60K 35/00 701/31.4 |
| 2012/0224060 A1 | 9/2012 | Gurevich et al. | |
| 2013/0147686 A1 | 6/2013 | Clavin et al. | |
| 2014/0002474 A1 | 1/2014 | Ashbrook et al. | |
| 2015/0046028 A1* | 2/2015 | Sprickmann Kerkerinck | B60K 35/00 701/36 |

OTHER PUBLICATIONS

Brakalov, "Information Systems", Report, retrieved from http://campar.in.tum.de/twiki/pub/Chair/TeachingWS05DrivingAssistanceHauptseminar/Information_Systems_Report.pdf, Technical University of Munich, 9 pages.

Simpson, "Nissan teases Google Glass for drivers with wearable display", www.cnet.com, Nov. 12, 2013, retrieved on Apr. 21, 2014 from http://www.cnet.com.au/nissan-teases-google-glass-for-drivers-with-wearable-display-339345939.htm, 5 pages.

Lavrinc, "Your Car Is the Killer App for Google Glass", www.wired.com, Autopia, Apr. 19, 2013, retrieved on Apr. 21, 2014 from http://www.wired.com/autopia/2013/04/google-glass-car/, 12 pages.

Phandroid, "Google Glass: Navigation", www.youtube.com, published May 9, 2013, http://www.youtube.com/watch?v=IZdkIVS53Uw, total video playtime 3 minutes 52 seconds.

(Continued)

*Primary Examiner* — Julie Lieu
(74) *Attorney, Agent, or Firm* — Ditthavong & Steiner, P.C.

(57) ABSTRACT

An approach is provided for causing, at least in part, a collection of sensor data from at least one virtual or augmented reality device associated with at least one user. The approach involves processing and/or facilitating a processing of the sensor data to cause, at least in part, a classification of the at least one user as a driver of at least one vehicle. The approach also involves causing, at least in part, an optimization of content information presented via the at least one virtual or augmented reality device based, at least in part, on the classification.

17 Claims, 15 Drawing Sheets

(56) References Cited

OTHER PUBLICATIONS

BBC News, "Ticket Issued to driver wearing Google Glass", BBC News Technology, Oct. 31, 2013, retrieved on Apr. 21, 2014 from http://www.bbc.co.uk/news/technology-24757224, 2 pages.
Notification of Transmittal of the International Search Report and the Written Opinion of the International Searching Authority, or the Declaration; Written Opinion of the International Searching Authority; and International Search Report for corresponding International Application No. PCT/EP2015/056853, dated Jun. 26, 2015, 14 pages.
Ohn-Bar et al., "Hand Gesture-based Visual User Interface for infotainment", Proceedings of the 4th International Conference on Automotive User Interfaces and Interactive Vehicular Applications, AutomotiveUI, Oct. 19, 2012, pp. 111-115.
Cheng et al., "Vision-Based Infotainment User Determination by Hand Recognition for Driver Assistance", IEEE Transactions on Intelligent Transportation Systems, Sep. 1, 2010, vol. 11, No. 3, pp. 759-764.

* cited by examiner

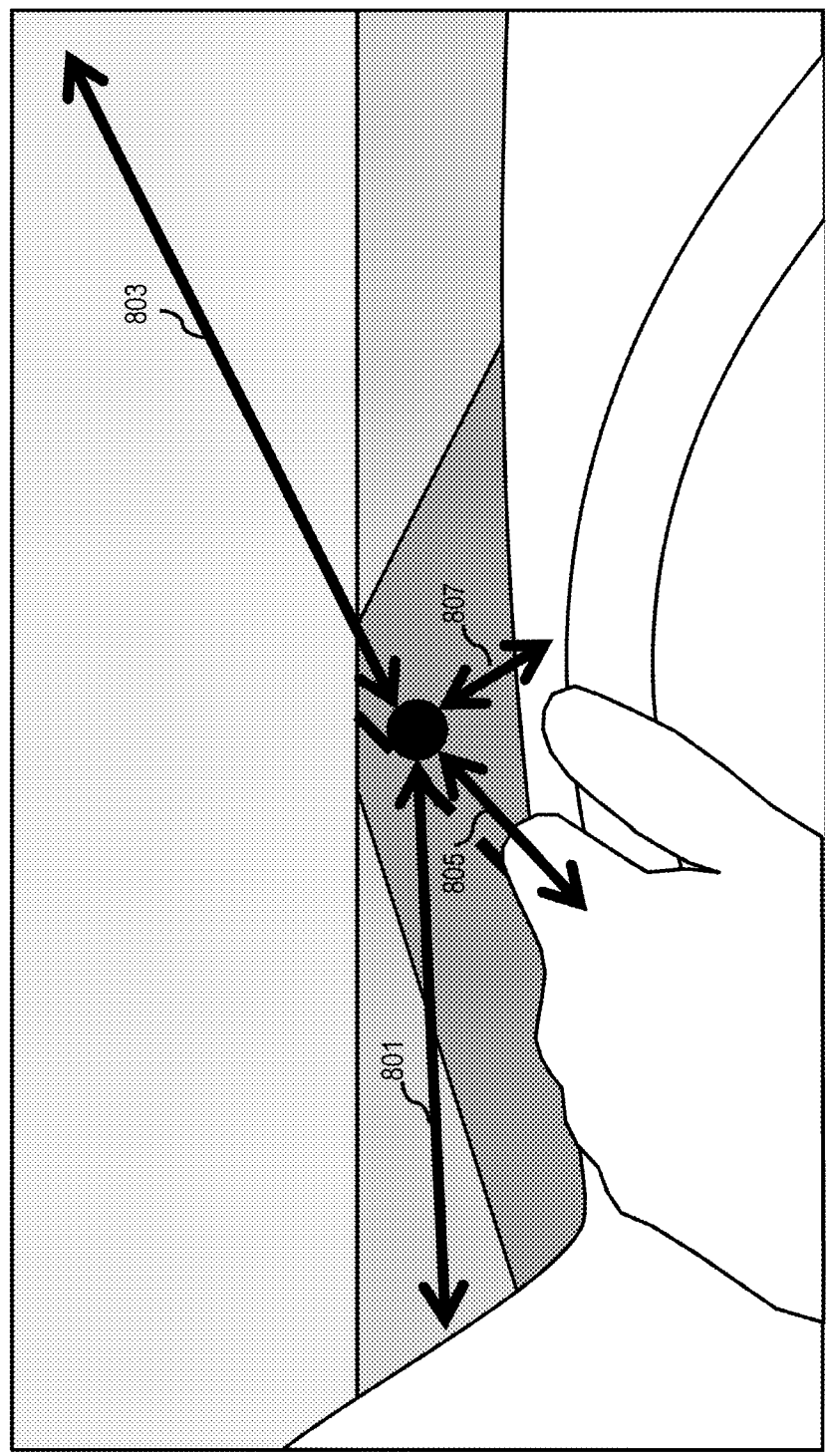

METHOD AND APPARATUS FOR IDENTIFYING A DRIVER BASED ON SENSOR INFORMATION

BACKGROUND

Reducing driver distractions has been a prevalent issue in the automotive industry. In particular, presentation of virtual or augmented reality content can be distracting to drivers. For example, a virtual or augmented reality device requires a driver to read and mentally process data presented, which takes time to understand and apply to the situation at hand. In addition, driver distractions may increase when such device provides irrelevant information in a visually displeasing manner. For example, when the virtual or augmented reality device unnecessarily assists the driver or presents non-driving related content. As a result, service providers face significant technical challenges optimizing content presented to drivers.

SOME EXAMPLE EMBODIMENTS

Therefore, there is a need for an approach for causing an optimization of one or more contents presented to at least one user classified as a driver of at least one vehicle by means of virtual or augmented reality device.

According to one embodiment, a method comprises causing, at least in part, a collection of sensor data from at least one virtual or augmented reality device associated with at least one user. The method also comprises processing and/or facilitating a processing of the sensor data to cause, at least in part, a classification of the at least one user as a driver of at least one vehicle. The method further comprises causing, at least in part, an optimization of content information presented via the at least one virtual or augmented reality device based, at least in part, on the classification.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a collection of sensor data from at least one virtual or augmented reality device associated with at least one user. The apparatus is also caused to process and/or facilitate a processing of the sensor data to cause, at least in part, a classification of the at least one user as a driver of at least one vehicle. The apparatus is further caused to cause, at least in part, an optimization of content information presented via the at least one virtual or augmented reality device based, at least in part, on the classification.

According to another embodiment, a computer-readable storage medium carries one or more sequences of one or more instructions which, when executed by one or more processors, cause, at least in part, an apparatus to cause, at least in part, a collection of sensor data from at least one virtual or augmented reality device associated with at least one user. The apparatus is also caused to process and/or facilitate a processing of the sensor data to cause, at least in part, a classification of the at least one user as a driver of at least one vehicle. The apparatus is further caused to cause, at least in part, an optimization of content information presented via the at least one virtual or augmented reality device based, at least in part, on the classification.

According to another embodiment, an apparatus comprises means for causing, at least in part, a collection of sensor data from at least one virtual or augmented reality device associated with at least one user. The apparatus also comprises means for processing and/or facilitating a processing of the sensor data to cause, at least in part, a classification of the at least one user as a driver of at least one vehicle. The apparatus further comprises means for causing, at least in part, an optimization of content information presented via the at least one virtual or augmented reality device based, at least in part, on the classification.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the virtual reality device side or on the augmented reality device side or on the mobile device side or in any shared way between service provider, virtual reality device, augmented reality device and mobile device with actions being performed on all sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for causing an optimization of one or more contents presented to at least one user classified as a driver of at least one vehicle by means of virtual or augmented reality device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
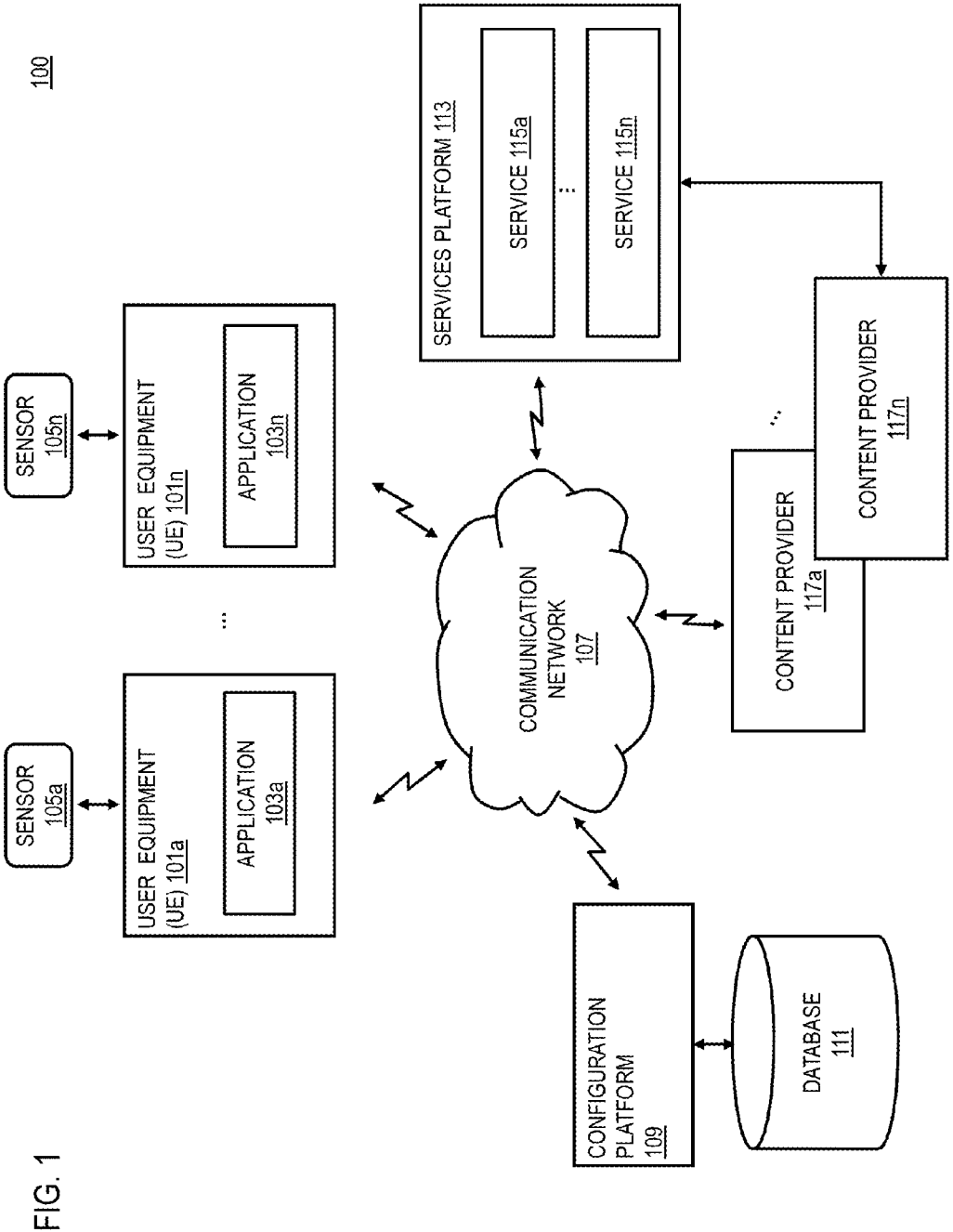
FIG. 1 is a diagram of a system capable of causing an optimization of one or more contents presented to at least one user classified as a driver of at least one vehicle by means of virtual or augmented reality device, according to one embodiment.

FIG. 1 is a diagram of a system capable of causing an optimization of one or more contents presented to at least one user classified as a driver of at least one vehicle by means of virtual or augmented reality device, according to one embodiment. One area of development has been presentation of content information via at least one virtual or augmented reality device to at least one driver. Such presentation is an easy way to get the attention of the driver, for example, virtual or augmented reality and electronic displays (e.g., near-eye displays, head-mounted displays, wearable display etc.), may overlay the content information on the view of a physical world by a display. However, such presentation can be distracting to a driver if irrelevant information appears on the display, particularly for near-eye displays and head-mounted displays due to the always-present nature of the display. In addition, presenting virtual or augmented reality content while driving can be distracting to drivers, for that reason, system 100 of FIG. 1 introduces the capability to optimize one or more contents presented to at least one user classified as a driver of at least one vehicle. The system 100 may reduce driver distraction by providing information only when necessary to assist the driver, and in a visually pleasing manner.

In one embodiment, system 100 causes monitoring of a position, a movement, or a combination thereof of the one or more users of the at least one vehicle. In one embodiment, the monitoring of the position and/or movement may be based on sensor information transmitted via at least one virtual or augmented reality device associated with the at least one user of the at least one vehicle. In this way, presentation of content information may be determined based on their importance and relevancy to the at least one user classified as the driver of the at least one vehicle. Accordingly, system 100 may control the presentation of one or more content information to reduce driver distractions.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, augmented reality glasses, virtual reality glasses or any combination thereof, including the accessories and peripherals of these devices, or any combination thereof. It is also contemplated that the UE 101 can support any type of interface to the user (such as "wearable" circuitry, etc.). In one embodiment, a virtual or augmented reality device may comprise of at least one processor, and at least one memory including computer program code for one or more computer programs configured to monitor position and/or movements of one or more users within the at least one vehicle. In one embodiment, the one or more vehicles may have cellular or WiFi connection either through the inbuilt communication equipment or from the UE 101 associated with the vehicles. The applications 103 may assist in conveying sensor information via the communication network 107.

By way of example, the applications 103 may be any type of application that is executable at the UE 101, such as location-based service applications, navigation applications, mapping application, content provisioning services, camera/imaging application, media player applications, social networking applications, calendar applications, and the like. In one embodiment, one of the applications 103 at the UE 101 may act as a client for the configuration platform 109 and may perform one or more functions associated with the functions of the configuration platform 109 by interacting with the configuration platform 109 over the communication network 107.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, WiFi, Li-Fi, near field communication etc.), temporal information, a camera/imaging sensor for gathering image data, an audio recorder for gathering audio data, and the like. In one scenario, the sensors 105 may include, light sensors, oriental sensors augmented with height sensor and acceleration sensor, tilt sensors, moisture sensors, pressure sensors, audio sensors (e.g., microphone), gaze tracking sensors etc. In one embodiment, the configuration platform 109 may cause gaze tracking of one or more users within the at least one vehicle using one or more cameras and/or sensors directed at the user's eyes.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components. The configuration platform 109 may include multiple servers, intelligent networking devices, computing devices, components and corresponding software for causing an optimization of one or more contents presented to at least one user classified as a driver of at least one vehicle by means of virtual or augmented reality device. In one embodiment, the configuration platform 109 may cause a collection of sensor data from at least one virtual or augmented reality device associated with at least one user. In one embodiment, the at least one virtual or augmented reality device may have a motion sensor configured to detect a motion of one or more users within the at least one device. In another embodiment, the at least one virtual or augmented reality device may include a camera to take picture or record a video of the user's view of his or her environment to use in implementing virtual or augmented reality functionality. Further, the virtual or augmented reality device may have WiFi connection through inbuilt communication equipment for conveying sensor information via the communication network 107.

In one embodiment, the configuration platform 109 may process and/or facilitate a processing of the sensor data to cause, at least in part, a classification of the at least one user as a driver of at least one vehicle. In one scenario, the configuration platform 109 may determine the at least one user driving the at least one vehicle based, at least in part, on the processing of the sensor data from at least one virtual or augmented reality device.

In one embodiment, the configuration platform 109 may cause an optimization of content information presented via the at least one virtual or augmented reality device based, at least in part, on the classification. In one embodiment, the configuration platform 109 may present content information determined to be important to a user classified as a driver with high level of noticeability required to draw the attention of the user. Further, the configuration platform 109 may present content of less importance to a user classified as a driver with low level of noticeability so that the user is not drawn to the presentation but rather perceives the representation randomly or naturally. In a further embodiment, to limit and/or reduce the intrusiveness and/or distraction caused by presentation of content information, the configuration platform 109 may present the content information during a saccade. Thus, the presentation may appear while the user is briefly blind as the user's eyes move from one position to another. When the saccade is over, the user may then be able to see the presentation of relevant information. In another embodiment, to limit and/or reduce the intrusiveness and/or distraction caused by presentation of content information, the configuration platform 109 may present the content information during the blinking. Thus, the presentation of less important content information may appear while the user's eyes are briefly closed and, thus, while the user temporarily cannot see. In one scenario, if there are multiple users of virtual or augmented reality glasses in a vehicle, the configuration platform 109 may use the sensor data of the virtual or augmented reality glasses used by the passengers to determine and classify the driver.

In one embodiment, the configuration platform 109 may utilize location-based technologies (sensors, GPS receivers, etc.) to determine location information regarding the UE 101 associated with the at least one vehicle. For example, the UE 101 may use one or more sensors to obtain information on the orientations, location information, or a combination thereof on the one or more vehicles. In another embodiment, the configuration platform 109 may process data set associated with the at least one vehicle, the one or more users, the surrounding, or a combination thereof to determine the at least one user driving the at least one vehicle. In a further embodiment, the configuration platform 109 may create the database 111 wherein the determined information, for example, location information and/or user position information may be stored. The information may be any multiple types of information that can provide means for aiding in the content provisioning and sharing process.

The services platform 113 may include any type of service. By way of example, the services platform 113 may include mapping services, location based services, navigation services, travel planning services, social networking services, content (e.g., audio, video, images, etc.) provisioning services, application services, storage services, contextual information determination services, information (e.g., weather, news, etc.) based services, etc. In one embodiment, the services platform 113 may interact with the UE 101, the configuration platform 109 and the content providers 117 to supplement or aid in the processing of the content information to optimize the presentation to the at least one driver.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the configuration platform 109 with relevant content information to be presented to the at least driver of the at least one vehicle travelling to the at least one destination.

The content providers 117 may provide content to the UE 101, the configuration platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in causing an optimization of content information presented to the at least one driver. In one embodiment, the content providers 117 may also store content associated with the UE 101, the configuration platform 109, and the services 115 of the services platform 113. In another embodiment, the content providers 117 may manage access to a central repository of data, and offer a consistent, standard interface to data, such as a repository of users' navigational data content.

By way of example, the UE 101, the configuration platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
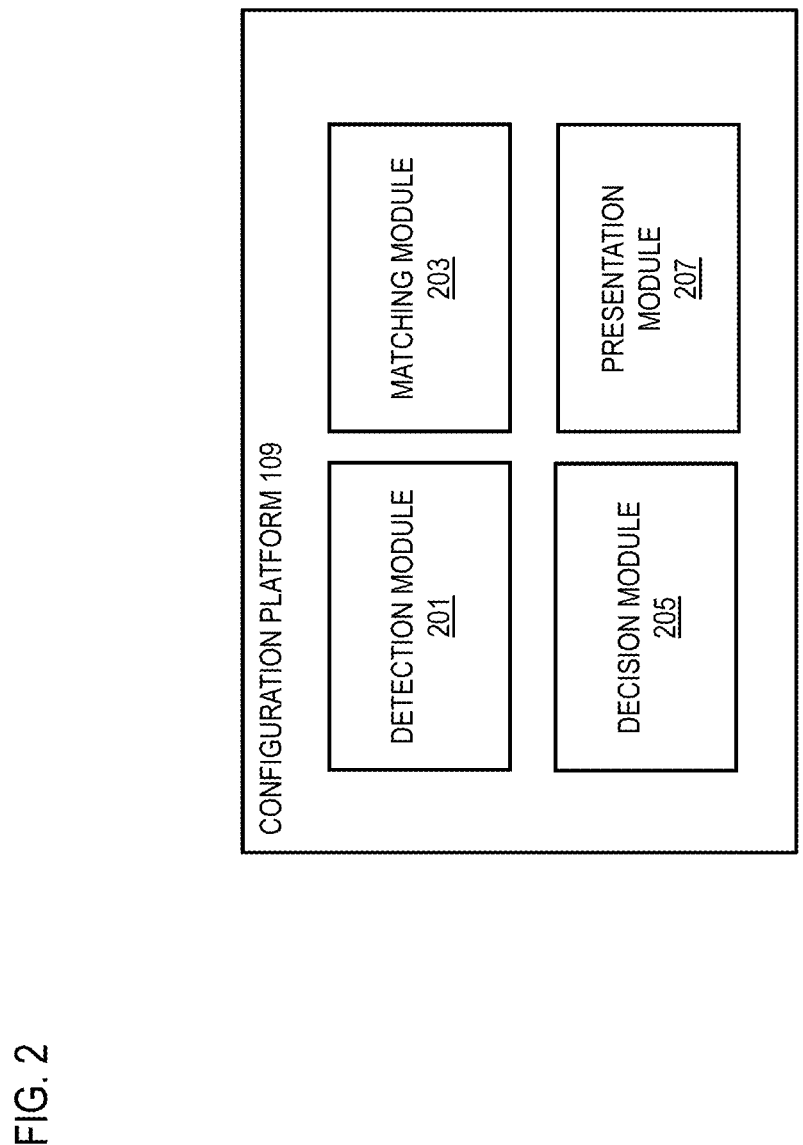
FIG. 2 is a diagram of the components of the configuration platform 109, according to one embodiment.

FIG. 2 is a diagram of the components of the configuration platform 109, according to one embodiment. By way of example, the configuration platform 109 includes one or more components for causing an optimization of one or more contents presented to at least one user classified as a driver of at least one vehicle by means of virtual or augmented reality device. It is contemplated that the functions of these components may be combined in one or more components or performed by other components of equivalent functionality. In this embodiment, the configuration platform 109 includes a detection module 201, a matching module 203, a decision module 205 and a presentation module 207.

In one embodiment, the detection module 201 may cause a detection of at least one user driving the at least one vehicle based, at least in part, on the seat positions, the user movements, the points of gaze, the at least one camera information, the at least one sensor information, or a combination thereof. In another embodiment, the detection module 201 may cause a detection of one or more user movements, the status of the at least one vehicle, or a combination thereof to permit a complete access to virtual or augmented reality services, any other services, or a combination thereof. In a further embodiment, the detection module 201 may cause a detection of at least one position of one or more users within the at least one vehicle based, at least in part, on the road line alignment, the frame of the at least one vehicle, the windshield of the at least one vehicle, the alignment of one or more mirrors of the at least one vehicle, the vehicle lightings, the position of the steering wheel, or a combination thereof. In an additional embodiment, the detection module 201 may cause a detection of location information for the at least one vehicle and may transmit the information to the matching module 203. In another embodiment, the detection module 201 may cause a detection of positioning of one or more hands of one or more users and may transmit the information to the matching module 203.

In one embodiment, the matching module 203 may cause a matching of the location information received from the detection module 201 for the at least one vehicle with the traffic rules of at least one region, the at least one country, or a combination thereof. In another embodiment, the matching module 203 may cause a matching of the movement patterns of the at least one user driving the at least one vehicle with the map data. In a further embodiment, the matching module 203 may cause a matching of the position of the at least one steering wheel to the position of at least one user, the one or more visible objects, or a combination. In an additional embodiment, the matching module 203 may cause a matching of the movement patterns between the one or more users within the at least one vehicle, for example, the points of gaze, the head movements, or a combination thereof of at least one user driving the at least one vehicle may follow the pattern of a driving task. In another embodiment, the matching module 203 may cause a matching of the positioning information for one or more hands of the one or more users received from the detection module 201 with the location of the one or more users, the direction of vehicle movement, or a combination thereof.

In one embodiment, the decision module 205 may determine the at least one user driving the at least one vehicle based, at least in part, on the processing of data set associated with the at least one vehicle, the one or more users, the surrounding, or a combination thereof. In another embodiment, the decision module 205 may cause an optimization of presentation of one or more contents to at least one user driving the at least one vehicle to minimize driver distraction. In a further embodiment, the decision module 205 may cause an implementation of driver distraction rules to optimize presentation of one or more contents to at least one user driving the at least one vehicle. In one scenario, the decision module 205 may cause a selection of relevant routing information for the at least one user for providing navigation guidance.

In one embodiment, the presentation module 207 may make a presentation of one or more contents upon receiving instructions from the decision module 205. This module obtains a set of summary statistics from other modules, and continues with providing presentation of relevant contents to the at least one user driving the at least one vehicle to minimize driver distraction. In another embodiment, the presentation module 207 may limit the content presented to the at least one driver to align the content with the driver distraction rules and guidelines. In a further embodiment, the presentation module 207 may optimize one or more contents for at least one driver based, at least in part, on the driving task. In one scenario, the association between a virtual or augmented reality glasses and the presentation display may be, for example, that the display is integrated into the UE 101, such as a display of a mobile phone, a display of head-worn glasses, etc. Where the display is a near-eye display or a head-mounted display, a representation of content may be presented based on the overlaying of information regarding the surrounding environment.

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 201-207 may be implemented for operation by respective UEs, as a configuration platform 109. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 3:
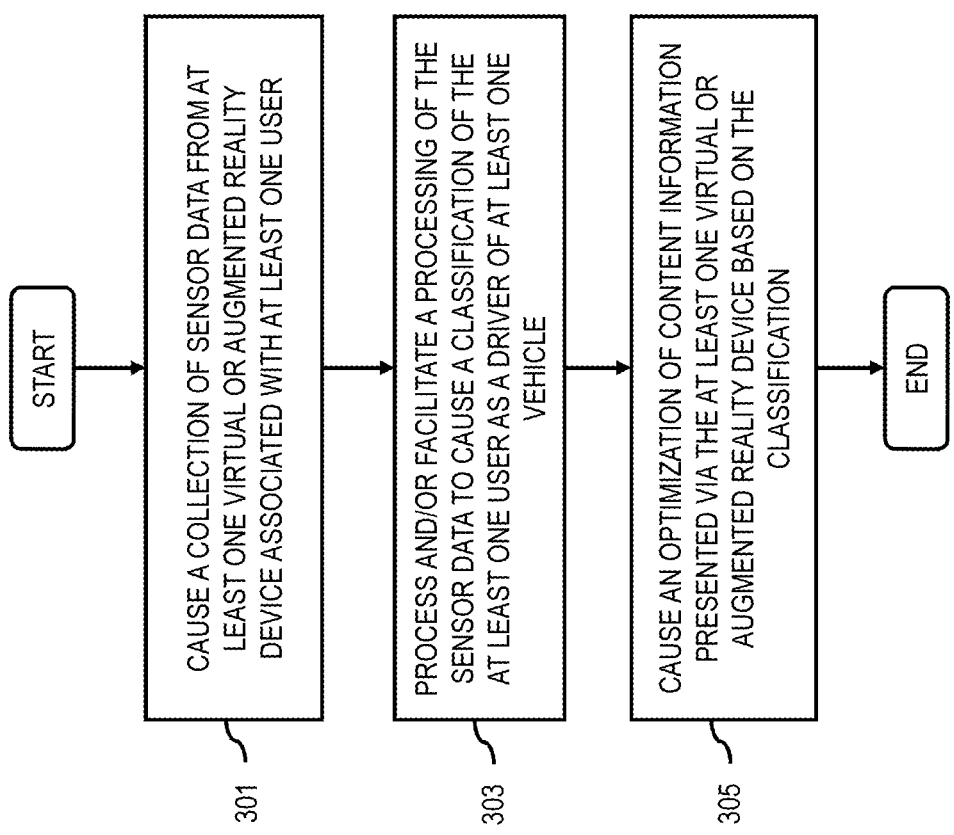
FIG. 3 is a flowchart of a process for causing an optimization of content information presented to the driver of at least one vehicle based, at least in part, on the processing of the sensor data from at least one virtual or augmented reality device, according to one embodiment.
Figure 10:
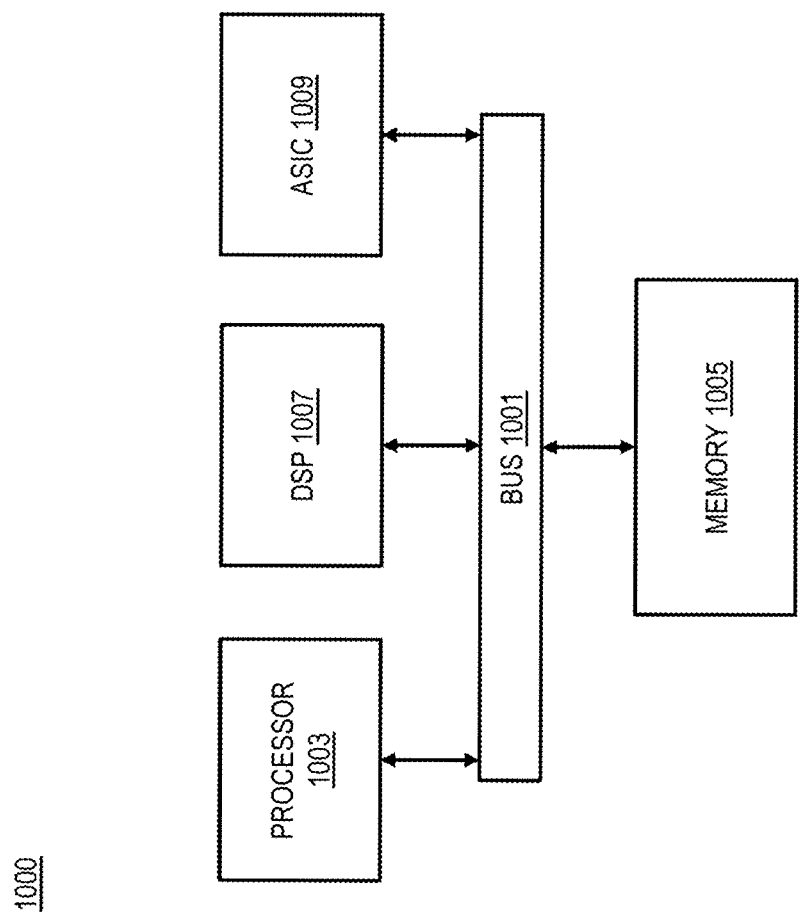
FIG. 10 is a diagram of a chip set that can be used to implement an embodiment of the invention.

FIG. 3 is a flowchart of a process for causing an optimization of content information presented to the driver of at least one vehicle based, at least in part, on the processing of the sensor data from at least one virtual or augmented reality device, according to one embodiment. In one embodiment, the configuration platform 109 performs the process 300 and is implemented in, for instance, a chip set including a processor and a memory as shown in FIG. 10.

In step 301, the configuration platform 109 causes, at least in part, a collection of sensor data from at least one virtual or augmented reality device associated with at least one user. In one embodiment, the configuration platform 109 may receive a set of sensor data associated with the at least one vehicle, the one or more users within the vehicle, the environment surrounding the vehicle, or a combination thereof from a virtual or augmented reality device. In one embodiment, the sensor data includes, at least in part, image data captured via one or more camera sensors of the at least one virtual or augmented reality device. In another embodiment, the sensor data includes, at least in part, movement data captured via one or more motion sensors of the at least one virtual or augmented reality device.

In step 303, the configuration platform 109 processes and/or facilitates a processing of the sensor data to cause, at least in part, a classification of the at least one user as a driver of at least one vehicle. In one embodiment, the configuration platform 109 processes sensor data collected from the virtual or augmented reality device to determine at least one user driving the at least one vehicle. In one scenario, the configuration platform 109 may determine at least one driver of the vehicle based on the seat positions of the one or more occupants of the vehicle. In another scenario, the configuration platform 109 may determine at least one driver of the vehicle based on user movements. In a further scenario, the configuration platform 109 may determine at least one driver of the vehicle based on camera information and/or sensor information. In one scenario, if the configuration platform 109 is uncertain upon processing of the content information for virtual or augmented reality devices used by the occupants of a vehicle, whether it has been used by the driver. The configuration platform 109 may process other virtual or augmented reality device used by the passengers in the vehicle to detect the driver. In one example embodiment, the configuration platform 109 may detect three occupants in a vehicle. The configuration platform 109 may further detect that all three occupants are using virtual or augmented reality glasses device. Then, the configuration platform 109 upon processing of the content information for virtual or augmented reality glasses device for two occupants may determine them to be passengers, thereby determining the third occupant using the other virtual or augmented reality glasses device to be the driver.

In step 305, the configuration platform 109 causes, at least in part, an optimization of content information presented via the at least one virtual or augmented reality device based, at least in part, on the classification. In one scenario, to reduce driver distraction the configuration platform 109 may optimize the presentation of contents to at least one user driving the at least one vehicle. In one example embodiment, the configuration platform 109 may monitor the movement patterns between the one or more occupants of the at least one vehicle. Then, the configuration platform 109 may cause a matching of the movement patterns with the map data. Consequently, upon determination of the driver of the vehicle, the configuration platform 109 may implement driver distraction rules to optimize the presentation of one or more contents to at least one user.

Figure 4:
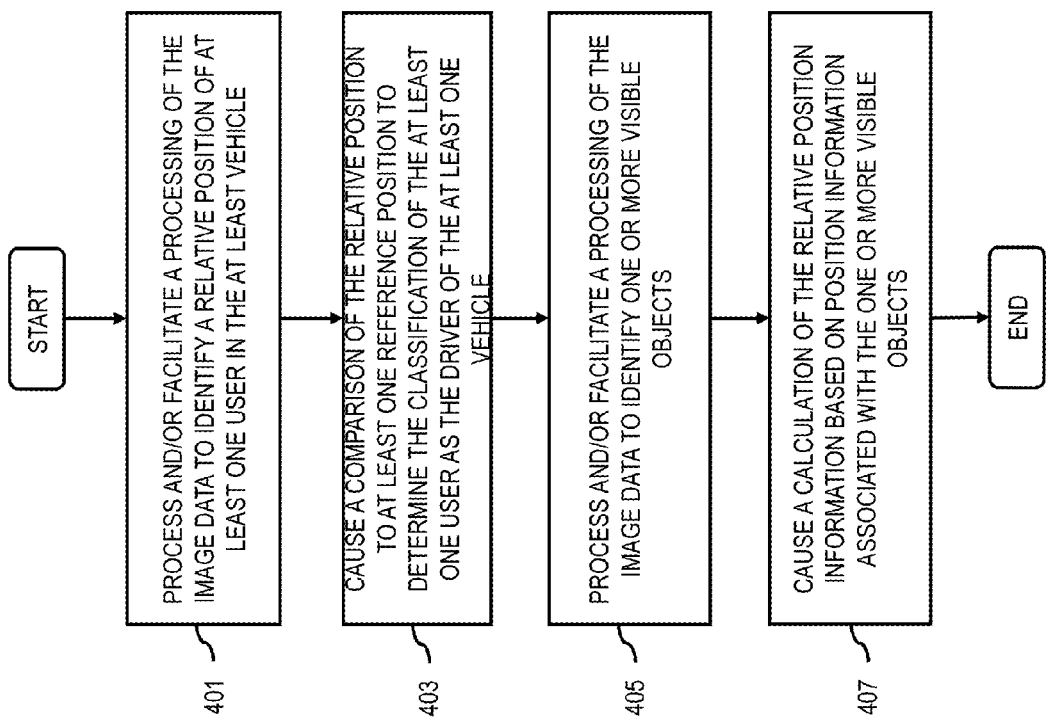
FIG. 4 is a flowchart of a process for processing image data to identify a relative position of at least one user, one or more visible objects, or a combination thereof for causing a comparison, a calculation, or a combination thereof, according to one embodiment.

FIG. 4 is a flowchart of a process for processing image data to identify a relative position of at least one user, one or more visible objects, or a combination thereof for causing a comparison, a calculation, or a combination thereof, according to one embodiment. In one embodiment, the configuration platform 109 performs the process 400 and is implemented in, for instance, a chip set including a processor and a memory as shown in FIG. 10.

In step 401, the configuration platform 109 processes and/or facilitates a processing of the image data to identify a relative position of at least one user in the at least one vehicle. In one scenario, the configuration platform 109 uses the one or more cameras of the virtual or augmented reality glasses device to detect if a user is the driver, for example, whether the user is sitting in front of a steering wheel. In another scenario, the configuration platform 109 may compare vehicle sensor data to detect occupied seats within a vehicle. Then, the configuration platform 109 may compare the occupied seat positions within a vehicle with the visible view of user. In a further scenario, if the virtual or augmented reality glasses used by the passengers in a vehicle detect a driver, it may submit the information to the backend or to the local network, thereby supporting in the detection of a driver. In one example embodiment, the virtual or augmented reality glasses used by the passengers may detect facial and other form of recognition to detect a driver, and may pass the information to the configuration platform 109.

In step 403, the configuration platform 109 causes, at least in part, a comparison of the relative position to at least one reference position to determine the classification of the at least one user as the driver of the at least one vehicle. In one scenario, the configuration platform 109 may compare the location and positioning of one or more users within the vehicle, for example, positioning of hands to user location and the direction of the vehicular movement. In another scenario, the configuration platform 109 may detect and compare the location of a steering wheel to the position of a user and the windshield in the vehicle. In another scenario, the configuration platform 109 may detect sensor data to detect occupied seats within a vehicle and may compare the occupied seat positions within a vehicle with the visible view of the user. In one example embodiment, at least one vehicle may be capable of detecting the occupants in the vehicle and may transmit the information to the configuration platform 109. The at least one vehicle may detect the number of occupants in the vehicle, that a driver is wearing a device that could be virtual or augmented reality glasses etc.

In step 405, the configuration platform 109 processes and/or facilitates a processing of the image data to identify one or more visible objects. In one embodiment, the one or more visible objects include, at least in part, a windshield, a windshield frame, a steering wheel, a driving lane marker, a mirror, a car frame, users' hands, or a combination thereof. In another scenario, the configuration platform 109 may compare the visible objects to a user's position in the vehicle. Such comparison facilitates the configuration platform 109 in detecting whether a user is a driver or the passenger in the vehicle.

In step 407, the configuration platform 109 causes, at least in part, a calculation of the relative position information based, at least in part, on position information associated with the one or more visible objects. In one embodiment, the relative position includes, at least in part, one or more driver positions, one or more passenger positions, or a combination thereof. In one scenario, the configuration platform 109 may detect and compare head movements of one or more users in the vehicle because a driver's head movement follows certain pattern which is different from the passengers. In another embodiment, the configuration platform 109 may build the movement patterns using the one or more sensors and camera devices. Then, the configuration platform 109 may compare the movement patterns to one or more visible views (dashboard, steering wheel, windshield etc.) in front of the user. In a further embodiment, the configuration platform 109 may detect the position of at least one vehicle to allow full access to virtual or augmented reality glasses and any services while vehicle is stationary.

Figure 5:
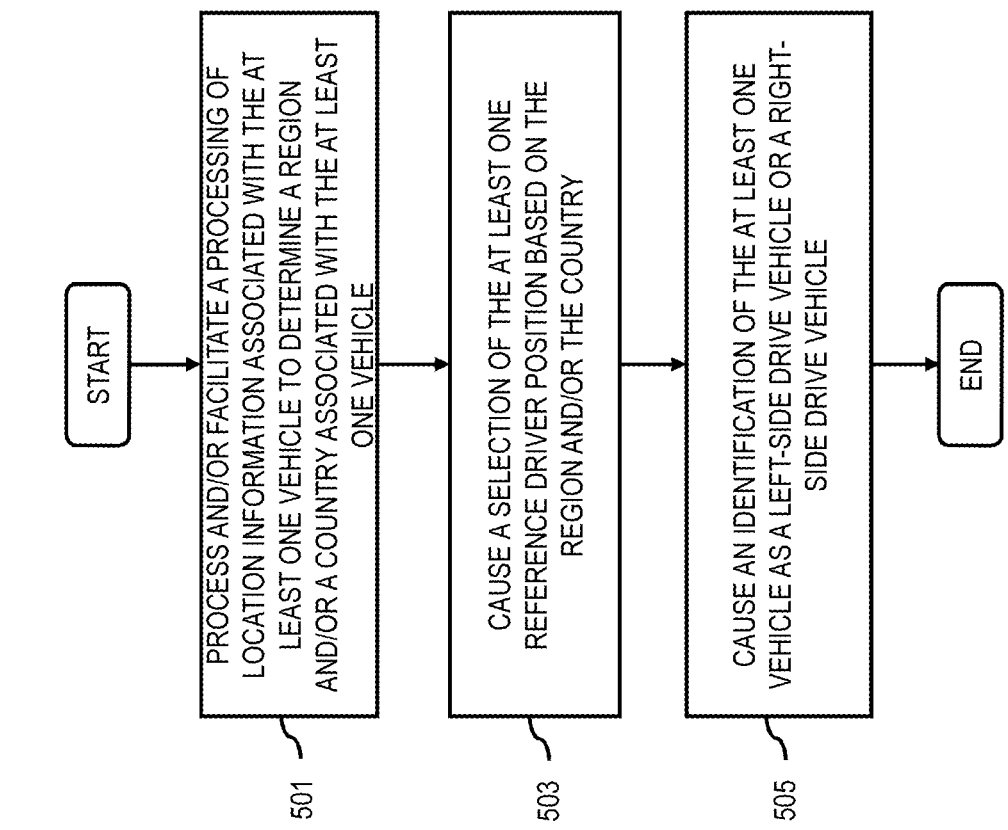
FIG. 5 is a flowchart of a process for processing of location information of at least one vehicle to determine a region, a country, or a combination thereof to cause a selection of the at least one reference driver position, according to one embodiment.

FIG. 5 is a flowchart of a process for processing of location information of at least one vehicle to determine a region, a country, or a combination thereof to cause a selection of the at least one reference driver position, according to one embodiment. In one embodiment, the configuration platform 109 performs the process 500 and is implemented in, for instance, a chip set including a processor and a memory as shown in FIG. 10.

In step 501, the configuration platform 109 processes and/or facilitates a processing of location information associated with the at least one vehicle to determine a region, a country, or a combination thereof associated with the at least one vehicle. Subsequently, the configuration platform 109 may determine traffic regulations and/or driver safety rules based, at least in part, on determination of the region and/or the country. Such rules and regulations are implemented by the configuration platform 109 during presentation of the content information to the driver.

In step 503, the configuration platform 109 causes, at least in part, a selection of the at least one reference driver position based, at least in part, on the region, the country, or a combination thereof. In one scenario, the configuration platform 109 may determine that vehicle Z is travelling in ABC state where traffic is right sided, and may cause a reference driver position based on such determination.

In step 505, the configuration platform 109 causes, at least in part, an identification of the at least one vehicle as a left-side drive vehicle or a right-side drive vehicle, wherein the selection of the at least one reference driver position is further based, at least in part, on the identification. In one scenario, the configuration platform 109 may compare vehicle data to detect position of a steering wheel to identify a vehicle as a left-side drive vehicle or a right-side drive vehicle.

Figure 6:
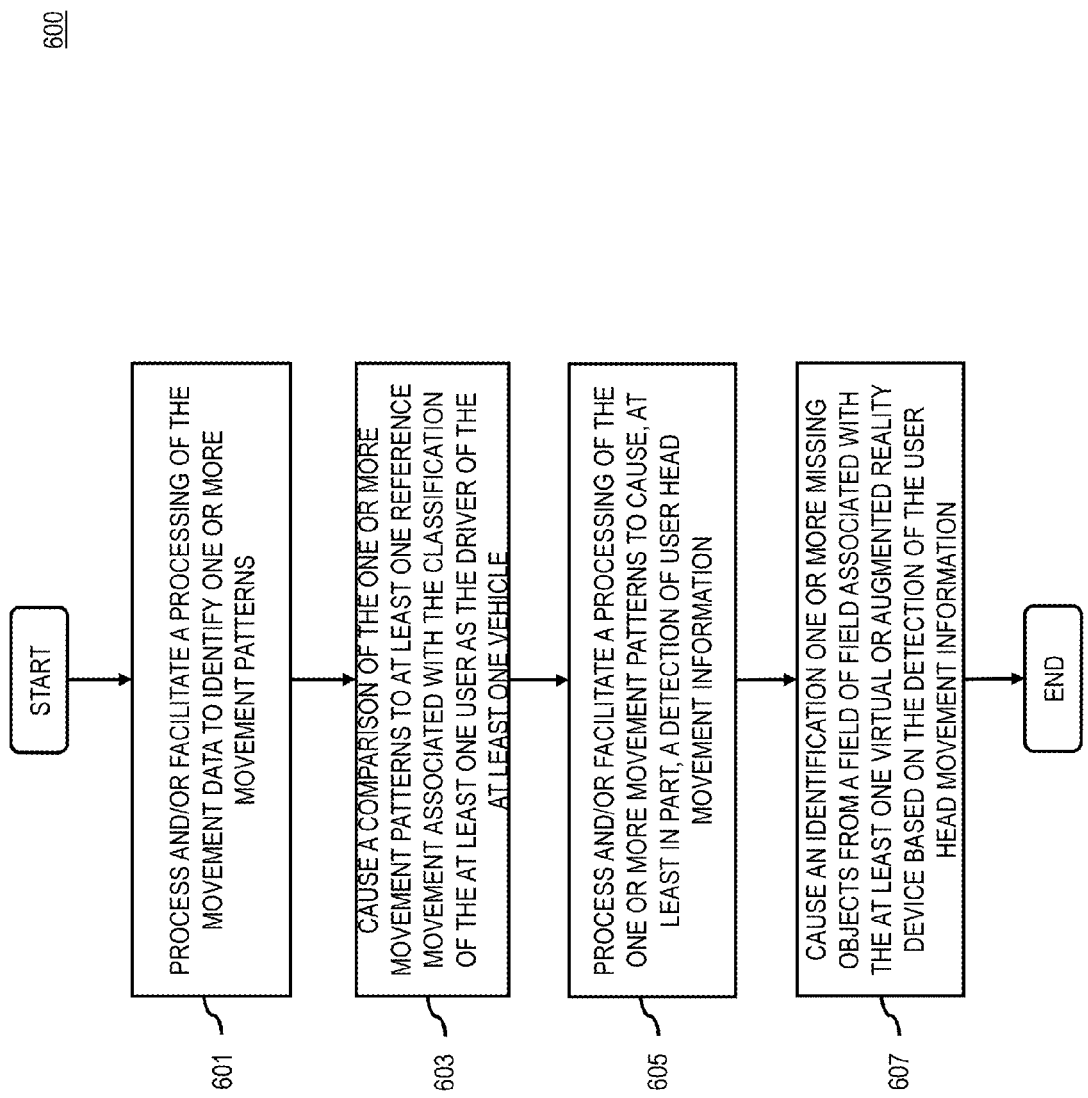
FIG. 6 is a flowchart of a process for identifying movement patterns by processing the movement data, and causing a comparison of the movement patterns to determine at least one user as the driver of the at least one vehicle, according to one embodiment.

FIG. 6 is a flowchart of a process for identifying movement patterns by processing the movement data, and causing a comparison of the movement patterns to determine at least one user as the driver of the at least one vehicle, according to one embodiment. In one embodiment, the configuration platform 109 performs the process 600 and is implemented in, for instance, a chip set including a processor and a memory as shown in FIG. 10.

In step 601, the configuration platform 109 processes and/or facilitates a processing of the movement data to identify one or more movement patterns. In one scenario, the configuration platform 109 may process head movement and gaze to detect if a user is driving. In another scenario, the configuration platform 109 may process hand positioning of one or more users with the direction of a vehicular movement.

In step 603, the configuration platform 109 causes, at least in part, a comparison of the one or more movement patterns to at least one reference movement associated with the classification of the at least one user as the driver of the at least one vehicle.

In step 605, the configuration platform 109 processes and/or facilitates a processing of the one or more movement patterns to cause, at least in part, a detection of user head movement information. In one scenario, the configuration platform 109 may utilize the sensors of the virtual or augmented reality glasses device to detect whether the head movements and gaze of the one or more users match with a driver's head movement patterns. A driver's head movement and gaze follow the patterns of a driving task. Similarly, the configuration platform 109 detects head movements of one or more users to determine whether the one or more users head movement follows the patterns of a driving task, for example, turning the head to look at the traffic lights, looking right and then left in a crossings etc. In another scenario, the configuration platform 109 may cause a matching of the head movements and gaze with map data, for example, whether the user is looking at left and then right in a crossing.

In step 607, the configuration platform 109 causes, at least in part, an identification of one or more missing objects from a field of field associated with the at least one virtual or augmented reality device based, at least in part, on the detection of the user head movement information, wherein the classification of the at least one user as the driver of the at least one vehicle is further based, at least in part, on the user head movement information and the one or more missing objects.

Figure 7:
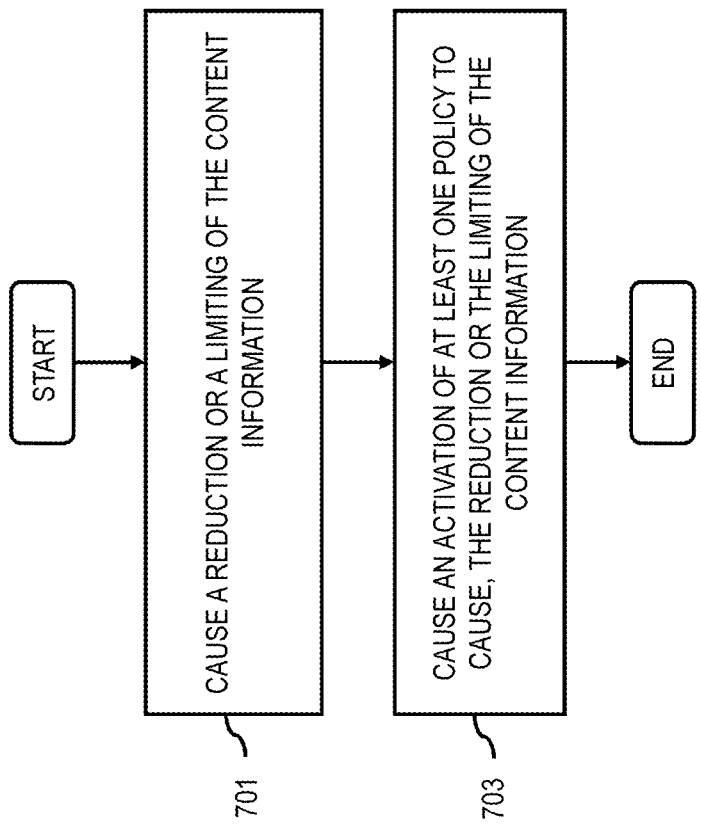
FIG. 7 is a flowchart of a process for causing an activation of at least one policy to reduce or limit the content information presented to at least one driver, according to one embodiment.
Figure 8B:
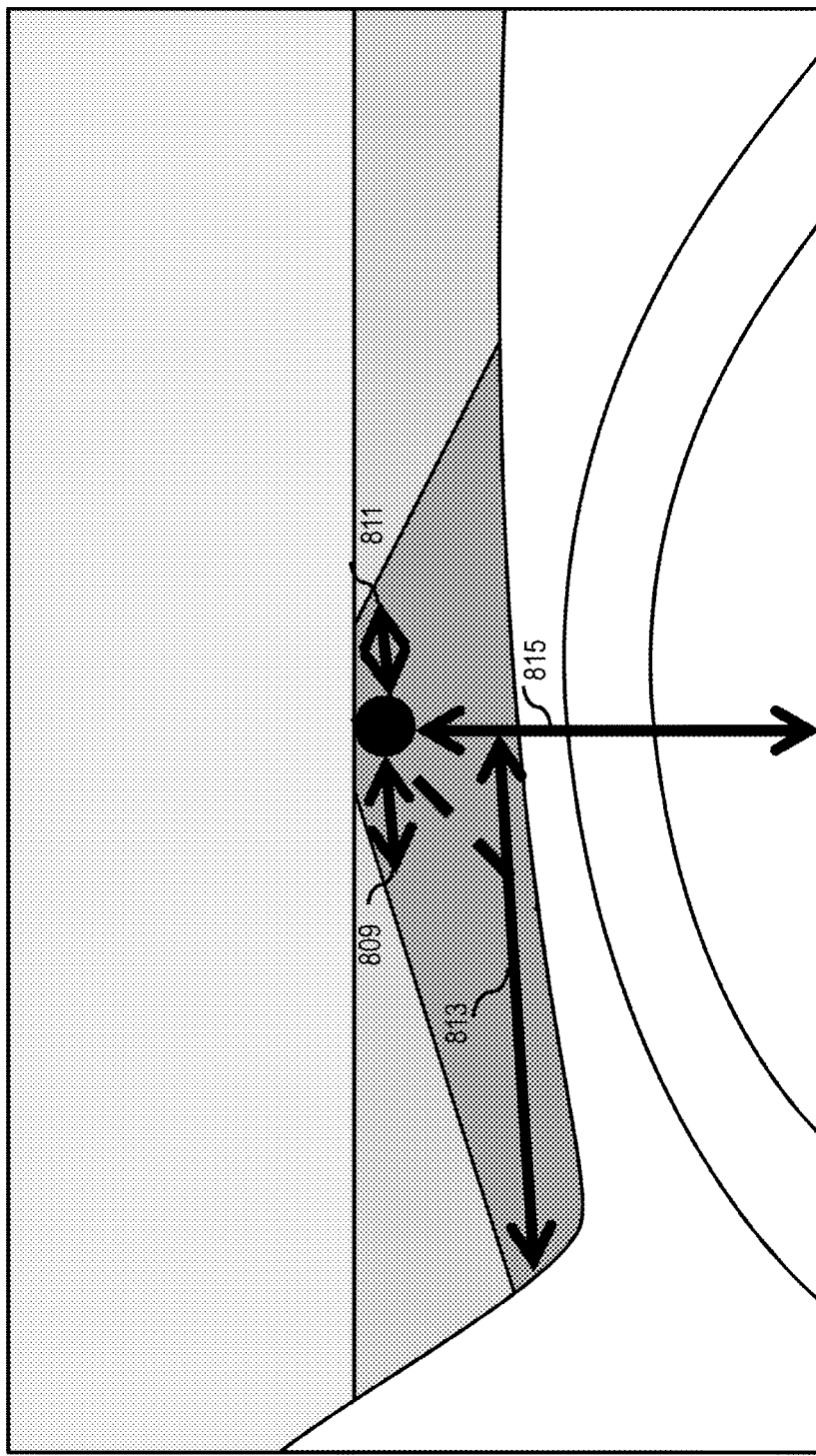
FIGS. 8 A-E are diagrams that represents a scenario wherein the configuration platform 109 categorizes one or more users in the at least one vehicle based on the processing of the sensor data received from the at least one virtual or augmented reality device, according to various embodiments.
Figure 8C:
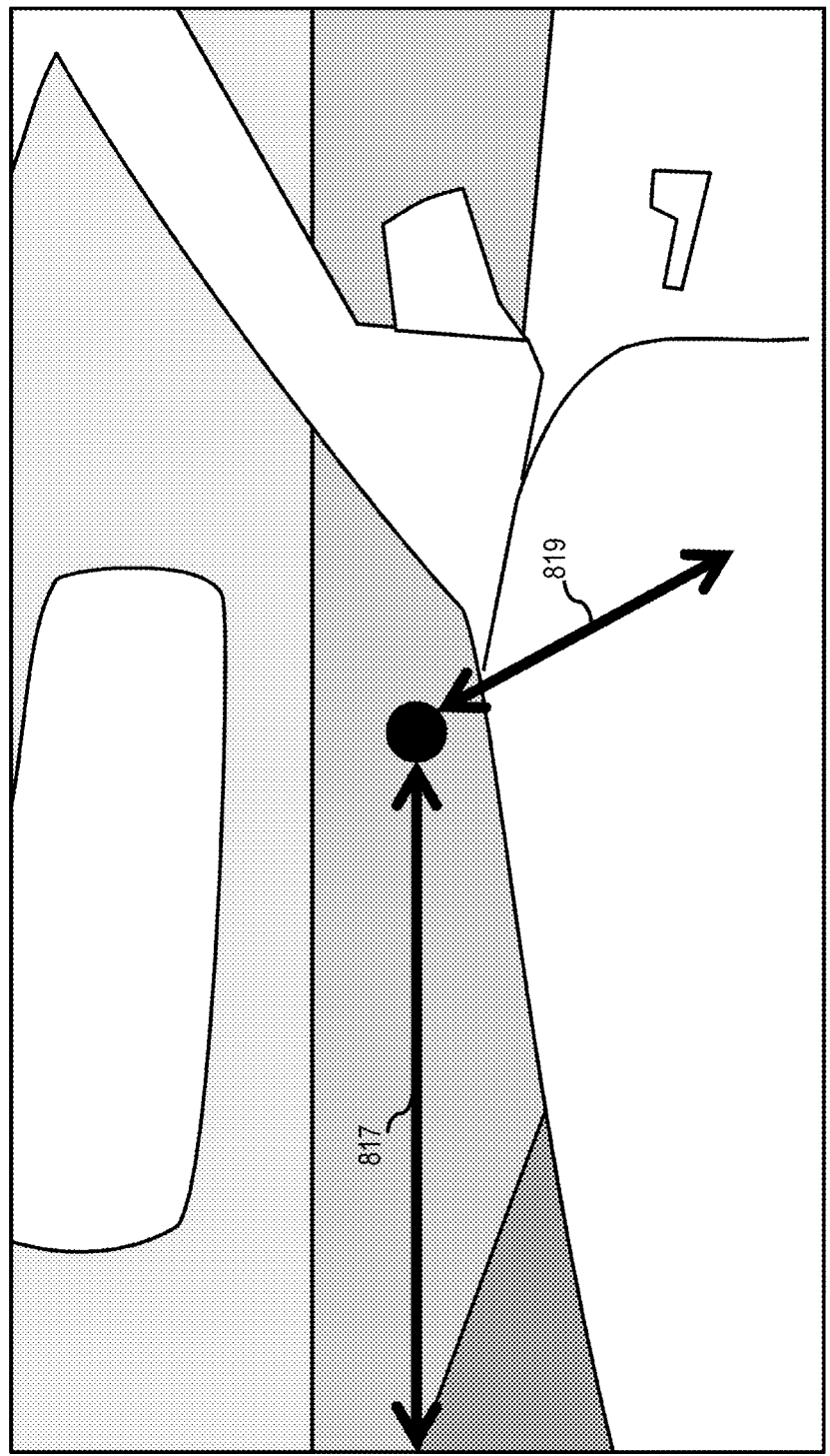
Figure 8D:
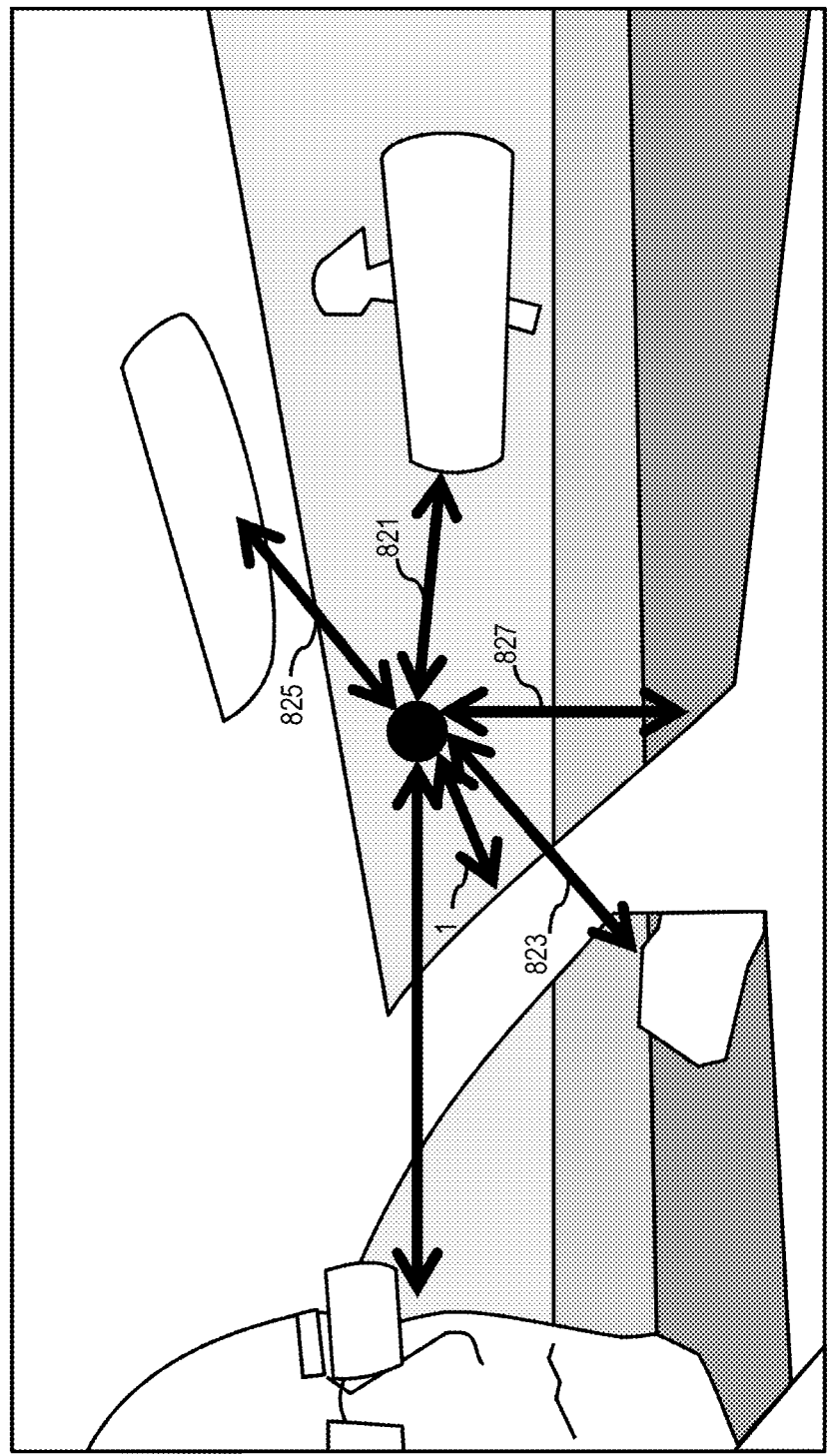
Figure 8E:
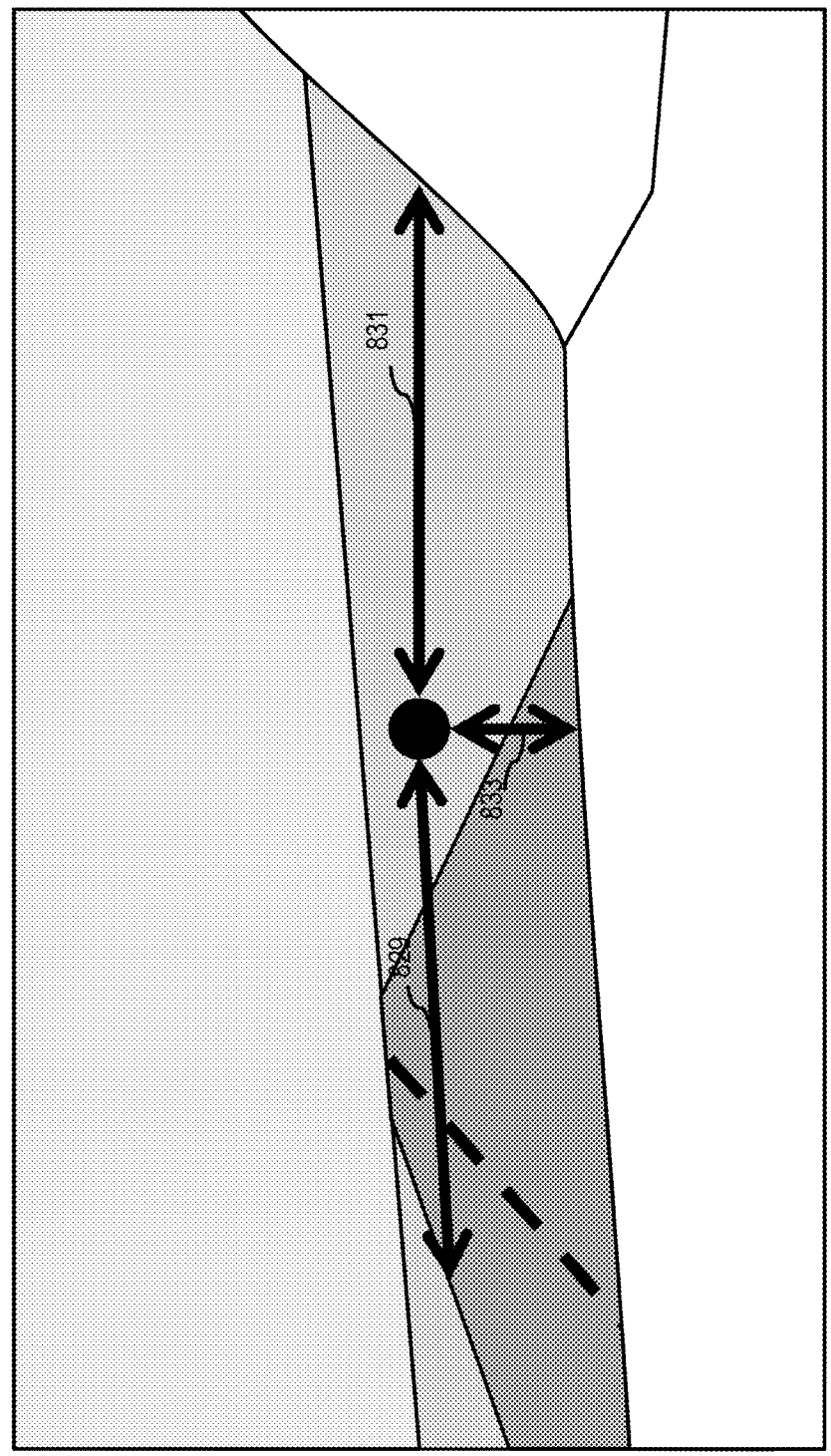

FIG. 7 is a flowchart of a process for causing an activation of at least one policy to reduce or limit the content information presented to at least one driver, according to one embodiment. In one embodiment, the configuration platform 109 performs the process 700 and is implemented in, for instance, a chip set including a processor and a memory as shown in FIG. 10.

In step 701, the configuration platform 109 causes, at least in part, a reduction or a limiting of the content information. In one scenario, the configuration platform 109 may limit the content presented to the at least one user if the user is determined to be driving. In another scenario, the configuration platform 109 may detect vehicular movement, and may allow presentation of content information to the driver upon determining that the vehicle is at a stop.

In step 703, the configuration platform 109 causes, at least in part, an activation of at least one policy to cause, the reduction or the limiting of the content information. In one scenario, the configuration platform 109 may limit the presented content information to align with driver distraction rules and/or driver safety guidelines. In another scenario, the one or more virtual or augmented reality devices in a vehicle may enforce the driver distraction rules, thereby optimizing the content presented to the multiple users in the vehicle when in doubt on the accuracy of driver classification. In one example embodiment, the configuration platform 109 may determine a front seat passenger holding onto the steering wheel as the driver, thereby limiting the content to the content that is relevant for the driving task. Such enforcement of relevant content can be done in a situation of emergency, for example, the configuration platform 109 may optimize the content for all virtual or augmented reality device users in the vehicle upon detecting that the vehicle is about to collide with another vehicle.

FIGS. 8 A-E are diagrams that represents a scenario wherein the configuration platform 109 categorizes one or more users in the at least one vehicle based on the processing of the sensor data received from the at least one virtual or augmented reality glasses, according to various embodiments. In FIG. 8A the configuration platform 109 may detect the position of the at least one driver based, at least in part, on the alignment with a road line [801], the frame of the at least one vehicle [803], the windshield of the at least one vehicle [803], the hand position [805], the position of the steering wheel [807], or a combination thereof. In one example embodiment, the configuration platform 109 may detect the position of user X based, at least in part, on the sensor information transmitted by the virtual or augmented reality glasses worn by user X or any other users in the vehicle. Then, the configuration platform 109 may process the sensor information to determine the at least one driver and the at least one passenger in the at least one vehicle. In FIG. 8B the configuration platform 109 may detect the position of the at least one driver based, at least in part, on the alignment with a road line [809, 811], the frame of the at least one vehicle [813], the windshield of the at least one vehicle [815], or a combination thereof. In one scenario, the configuration platform 109 may determine the field of view based on the position and/or the movement of the one or more users within the at least one vehicle. Then, the status of one or more users may be determined based, at least in part, on the field of view. Consequently, the presentation of one or more content information may be based, at least in part, on the status. In FIG. 8C the configuration platform 109 may determine at least one driver from the other passengers in the at least one vehicle based, at least in part, on the head movements [817], missing objects around the at least one user [819], or a combination thereof. In one example embodiment, the configuration platform 109 may determine the at least one user within the at least one vehicle to be a passenger because there is no steering wheel positioned ahead of his/her seating area. In another example embodiment, the configuration platform 109 may compare the head movements of one or more users within a vehicle with the routing information to the at least one destination and may determine the at least one user to be the driver, for example, the configuration platform 109 may detect at least one user turning his head towards right-hand direction to take a right turn and/or turning his head upwards to notice the traffic lights, an indication that the user is a driver. In FIG. 8D the configuration platform 109 may determine at least one passenger in the at least one vehicle by detecting user position in the at least one vehicle based, at least in part, on alignment of one or more vehicle mirrors [821, 823], one or more vehicle lights [825], the at least one steering wheel [827], the at least one street line, or a combination thereof. In FIG. 8E the configuration platform 109 may determine at least one passenger in the at least one vehicle by detecting user position in the at least one vehicle based, at least in part, on alignment with road line [829], the frame of the at least one vehicle [831], windshield of the at least one vehicle [833], or a combination thereof.

The processes described herein for causing an optimization of one or more contents presented to at least one user classified as a driver of at least one vehicle by means of virtual or augmented reality device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
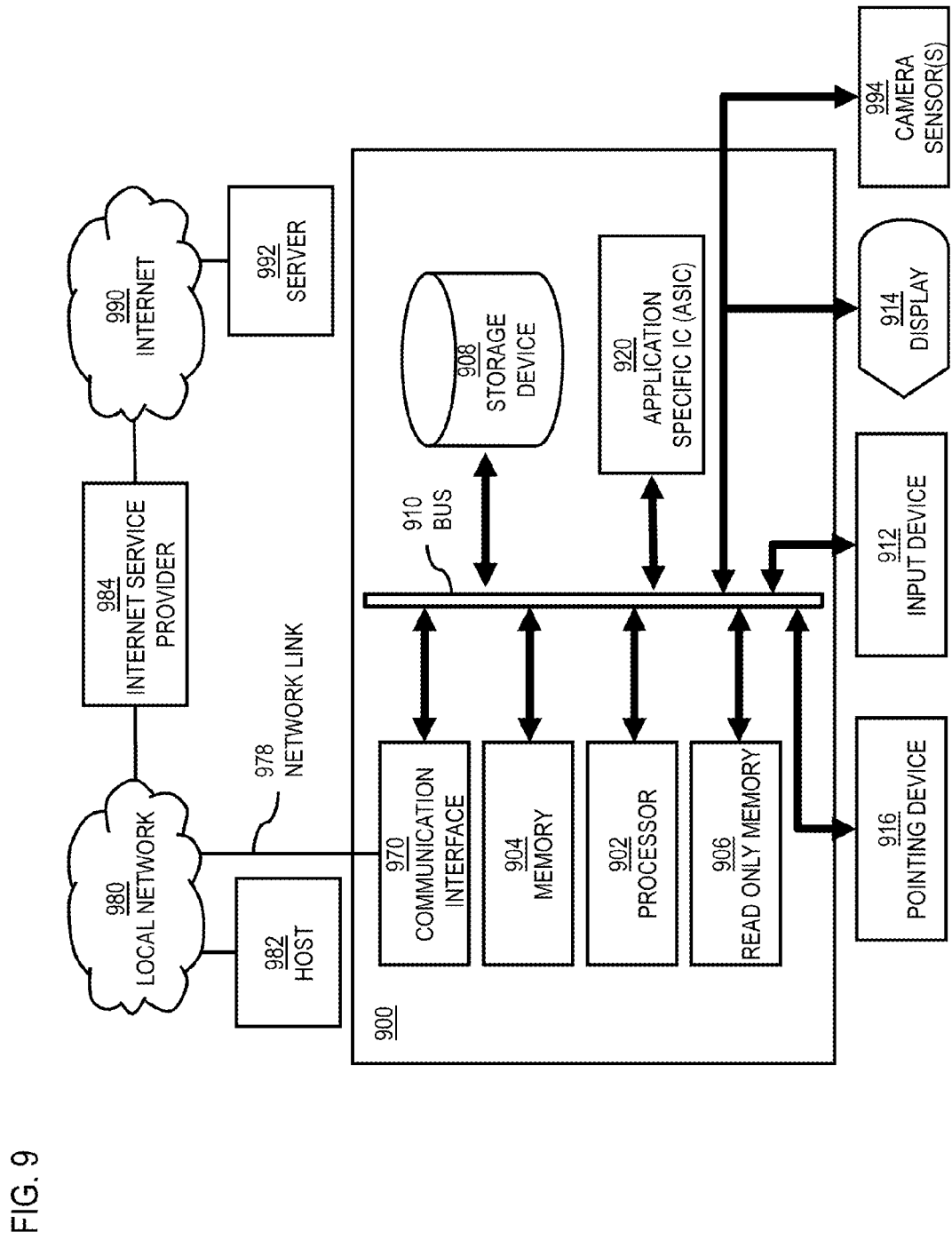
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to cause an optimization of one or more contents presented to at least one user classified as a driver of at least one vehicle by means of virtual or augmented reality device as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of causing an optimization of one or more contents presented to at least one user classified as a driver of at least one vehicle by means of virtual or augmented reality device.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to causing an optimization of one or more contents presented to at least one user classified as a driver of at least one vehicle by means of virtual or augmented reality device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for causing an optimization of one or more contents presented to at least one user classified as a driver of at least one vehicle by means of virtual or augmented reality device. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for causing an optimization of one or more contents presented to at least one user classified as a driver of at least one vehicle by means of virtual or augmented reality device, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for causing an optimization of one or more contents presented to at least one user classified as a driver of at least one vehicle by means of virtual or augmented reality device to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to cause an optimization of one or more contents presented to at least one user classified as a driver of at least one vehicle by means of virtual or augmented reality device as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of causing an optimization of one or more contents presented to at least one user classified as a driver of at least one vehicle by means of virtual or augmented reality device.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to cause an optimization of one or more contents presented to at least one user classified as a driver of at least one vehicle by means of virtual or augmented reality device. The memory 1005 also stores the data associated with or generated by the execution of the inventive steps.

Figure 11:
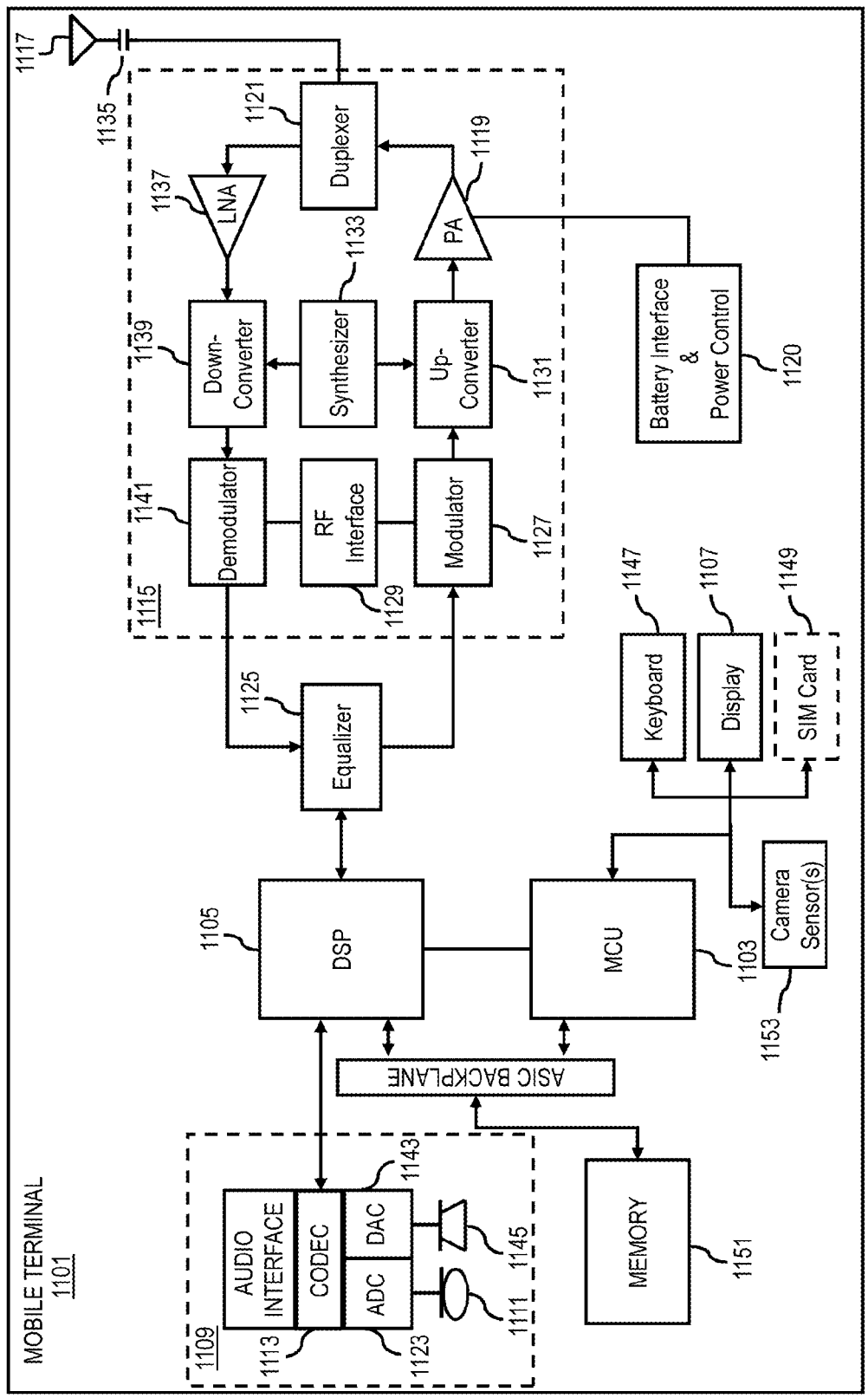
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of causing an optimization of one or more contents presented to at least one user classified as a driver of at least one vehicle by means of virtual or augmented reality device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of causing an optimization of one or more contents presented to at least one user classified as a driver of at least one vehicle by means of virtual or augmented reality device. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to cause an optimization of one or more contents presented to at least one user classified as a driver of at least one vehicle by means of virtual or augmented reality device. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:
    causing, at least in part, a collection of sensor data from at least one virtual or augmented reality device associated with at least one user, wherein the sensor data includes, at least in part, image data captured via one or more camera sensors of the at least one virtual or augmented reality device;
    processing and/or facilitating a processing of the sensor data to cause, at least in part, a classification of the at least one user as a driver of at least one vehicle;
    causing, at least in part, an optimization of content information presented via the at least one virtual or augmented reality device based, at least in part, on the classification;
    processing and/or facilitating a processing of the image data to identify a relative position of at least one user in the at least one vehicle; and
    causing, at least in part, a comparison of the relative position to at least one reference position to determine the classification of the at least one user as the driver of the at least one vehicle.

2. A method of claim 1, further comprising:
    processing and/or facilitating a processing of the image data to identify one or more visible objects; and
    causing, at least in part, a calculation of the relative position information based, at least in part, on position information associated with the one or more visible objects.

3. A method of claim 2, wherein the one or more visible objects include, at least in part, a windshield, a windshield frame, a steering wheel, a driving lane marker, a mirror, a car frame, a user hand, or a combination thereof.

4. A method of claim 1, wherein the relative position includes, at least in part, one or more driver positions, one or more passenger positions, or a combination thereof.

5. A method of claim 1, further comprising:
processing and/or facilitating a processing of location information associated with the at least one vehicle to determine a region, a country, or a combination thereof associated with the at least one vehicle; and
causing, at least in part, a selection of the at least one reference driver position based, at least in part, on the region, the country, or a combination thereof.

6. A method of claim 5, further comprising:
causing, at least in part, an identification of the at least one vehicle as a left-side drive vehicle or a right-side drive vehicle,
wherein the selection of the at least one reference driver position is further based, at least in part, on the identification.

7. A method of claim 1, wherein the sensor data includes, at least in part, movement data, the method further comprising:
processing and/or facilitating a processing of the movement data to identify one or more movement patterns; and
causing, at least in part, a comparison of the one or more movement patterns to at least one reference movement associated with the classification of the at least one user as the driver of the at least one vehicle.

8. A method of claim 7, further comprising:
processing and/or facilitating a processing of the one or more movement patterns to cause, at least in part, a detection of user head movement information; and
causing, at least in part, an identification of one or more missing objects from a field of field associated with the at least one virtual or augmented reality device based, at least in part, on the detection of the user head movement information,
wherein the classification of the at least one user as the driver of the at least one vehicle is further based, at least in part, on the user head movement information and the one or more missing objects.

9. A method of claim 1, wherein the optimization of the content information comprises at least one of:
causing, at least in part, a reduction or a limiting of the content information; and
causing, at least in part, an activation of at least one policy to cause, the reduction or the limiting of the content information.

10. An apparatus comprising:
at least one processor; and
at least one memory including computer program code for one or more programs,
the at least one memory and the computer program code configured to, with the at least one processor, cause the apparatus to perform at least the following:
cause, at least in part, a collection of sensor data from at least one virtual or augmented reality device associated with at least one user, wherein the sensor data includes, at least in part, image data captured via one or more camera sensors of the at least one virtual or augmented reality device;
process and/or facilitate a processing of the sensor data to cause, at least in part, a classification of the at least one user as a driver of at least one vehicle;
cause, at least in part, an optimization of content information presented via the at least one virtual or augmented reality device based, at least in part, on the classification;
process and/or facilitate a processing of the image data to identify a relative position of at least one user in the at least one vehicle; and
cause, at least in part, a comparison of the relative position to at least one reference position to determine the classification of the at least one user as the driver of the at least one vehicle.

11. An apparatus of claim 10, wherein the apparatus is further caused to:
process and/or facilitate a processing of the image data to identify one or more visible objects; and
cause, at least in part, a calculation of the relative position information based, at least in part, on position information associated with the one or more visible objects.

12. An apparatus of claim 10, wherein the apparatus is further caused to:
process and/or facilitate a processing of location information associated with the at least one vehicle to determine a region, a country, or a combination thereof associated with the at least one vehicle; and
cause, at least in part, a selection of the at least one reference driver position based, at least in part, on the region, the country, or a combination thereof.

13. An apparatus of claim 12, wherein the apparatus is further caused to:
cause, at least in part, an identification of the at least one vehicle as a left-side drive vehicle or a right-side drive vehicle,
wherein the selection of the at least one reference driver position is further based, at least in part, on the identification.

14. An apparatus of claim 10, wherein the sensor data includes, at least in part, movement data, wherein the apparatus is further caused to:
process and/or facilitate a processing of the movement data to identify one or more movement patterns; and
cause, at least in part, a comparison of the one or more movement patterns to at least one reference movement associated with the classification of the at least one user as the driver of the at least one vehicle.

15. An apparatus of claim 14, wherein the apparatus is further caused to:
process and/or facilitate a processing of the one or more movement patterns to cause, at least in part, a detection of user head movement information; and
causing, at least in part, an identification of one or more missing objects from a field of field associated with the at least one virtual or augmented reality device based, at least in part, on the detection of the user head movement information,
wherein the classification of the at least one user as the driver of the at least one vehicle is further based, at least in part, on the user head movement information and the one or more missing objects.

16. A non-transitory computer-readable storage medium carrying one or more sequences of one or more instructions which, when executed by one or more processors, cause an apparatus to at least perform the following steps:
cause, at least in part, a collection of sensor data from at least one virtual or augmented reality device associated with at least one user, wherein the sensor data includes, at least in part, image data captured via one or more camera sensors of the at least one virtual or augmented reality device;

process and/or facilitate a processing of the sensor data to cause, at least m part, a classification of the at least one user as a driver of at least one vehicle;

cause, at least in part, an optimization of content information presented via the at least one virtual or augmented reality device based, at least in part, on the classification;

process and/or facilitate a processing of the image data to identify a relative position of at least one user in the at least one vehicle; and cause, at least in part, a comparison of the relative position to at least one reference position to determine the classification of the at least one user as the driver of the at least one vehicle.

17. A non-transitory computer-readable storage medium of claim 16, wherein the apparatus is further caused to:

process and/or facilitate a processing of the image data to identify one or more visible objects; and cause, at least in part, a calculation of the relative position information based, at least in part, on position information associated with the one or more visible objects.

* * * * *